(12) United States Patent  (10) Patent No.: US 8,596,809 B2
Johnston et al.  (45) Date of Patent: Dec. 3, 2013

(54) SUSPENDED OPTICAL FILM

(75) Inventors: Raymond P. Johnston, Lake Elmo, MN (US); David G. Freier, Saint Paul, MN (US); Mieczyslaw H. Mazurek, Roseville, MN (US); Martin Kristoffersen, Maplewood, MN (US); John A. Wheatley, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 245 days.

(21) Appl. No.: 12/993,344

(22) PCT Filed: May 15, 2009

(86) PCT No.: PCT/US2009/044071
§ 371 (c)(1),
(2), (4) Date: Nov. 18, 2010

(87) PCT Pub. No.: WO2009/148796
PCT Pub. Date: Dec. 10, 2009

(65) Prior Publication Data
US 2011/0063854 A1 Mar. 17, 2011

Related U.S. Application Data

(60) Provisional application No. 61/057,434, filed on May 30, 2008.

(51) Int. Cl.
G09F 13/08 (2006.01)
G09F 13/10 (2006.01)

(52) U.S. Cl.
USPC ............ 362/97.4; 362/606; 362/618

(58) Field of Classification Search
USPC ............ 362/97.1–97.4, 606–607, 617–620, 362/627, 632–634; 349/58–64
See application file for complete search history.

(56) References Cited

U.S. PATENT DOCUMENTS

| 6,010,751 | A | 1/2000 | Shaw et al. |
|---|---|---|---|
| 6,172,810 | B1 | 1/2001 | Fleming et al. |
| 6,459,514 | B2 | 10/2002 | Gilbert et al. |
| 6,531,230 | B1 | 3/2003 | Weber et al. |
| 6,827,886 | B2 | 12/2004 | Neavin et al. |
| 7,905,650 | B2 | 3/2011 | Ma et al. |
| 2004/0145913 | A1 | 7/2004 | Ouderkirk et al. |
| 2006/0171164 | A1* | 8/2006 | Kida ..................... 362/608 |
| 2006/0193577 | A1 | 8/2006 | Ouderkirk et al. |
| 2006/0194487 | A1 | 8/2006 | Ouderkirk et al. |
| 2006/0257678 | A1 | 11/2006 | Benson, Jr. et al. |
| 2007/0236939 | A1 | 10/2007 | Ouderkirk et al. |
| 2007/0237938 | A1 | 10/2007 | Ouderkirk et al. |
| 2008/0192482 | A1 | 8/2008 | Laney et al. |

FOREIGN PATENT DOCUMENTS

| JP | 6-342603 | 12/1994 |
|---|---|---|
| KR | 2003-0079421 | 10/2003 |

* cited by examiner

Primary Examiner — Jason Moon Han

(57) ABSTRACT

Suspended optical film assemblies including a frame, an optical film, and an elastomeric film are disclosed. The elastomeric films include a first attachment region, a second attachment region, and a free region between the first and second attachment regions. The first attachment region is affixed to the frame; the second attachment region is affixed to the optical film, so that the free region is in tension and supports the optical film within the frame. The tension in the elastomeric film free region can help maintain flatness and reduce distortion in the optical film during environmental changes that influence dimensional changes in the frame, optical film, and elastomeric film.

20 Claims, 8 Drawing Sheets

SUSPENDED OPTICAL FILM

CROSS REFERENCE TO RELATED APPLICATIONS

This application is a national stage filing under 35 U.S.C. 371 of PCT/US2009/004071, filed May 15, 2009, which claims priority to U.S. Application No. 61/057,434, filed May 30, 2008, the disclosure of which is incorporated by reference in its entirety herein.

BACKGROUND

Back lighted displays arrange an imaging plane in front of a backlight that illuminates the image. The images can be fixed or changeable. Liquid crystal displays (LCDs) and graphic printed transparent images often use backlights to illuminate the imaging plane. Exemplary backlights are uniformly bright, highly luminous, lightweight, inexpensively produced, and thin. Such qualities become more challenging with the growing use of light emitting diodes (LEDs) or other point light sources, the increasing size of displays, and the market drive for thinner and more slender designs. In addition to these features of backlights, optical film components are typically placed in front of the imaging planes to control the distribution of the image, image quality, and reduction in visual defects in the display or display content. Large screen TV's require large area film components that must be able to withstand manufacturing, shipping and use.

Optical film stacks in backlights and displays are typically supported in laminated sandwiches with thicker sheets of optical material. In such laminates, the optical film and additional sheets are directly attached or in close association with each other, to keep the individual films and sheets from shifting, wrinkling, or buckling. This approach can limit the use of thin films due to their flexibility and tendency to buckle or distort. Thicker sheet based methods of incorporating optical components in the displays can introduce significant parasitic optical losses in efficiency, as well as increasing weight and thickness. Absorption, scatter, and parasitic total internal reflection (TIR) light losses can be significant for thick sheet based display designs. Further, added interfaces when assembling film stacks using traditional methods introduces new defect opportunities in the display manufacturing process. Another method of incorporating optical films is to support the films with supporting wire or pins. Yet another method is to suspend films using discrete anchor points to hold the film in tension. Each of these methods suffers from significant limitations.

SUMMARY

In one aspect, suspended optical film assemblies are disclosed that include a frame, and optical film, and an elastomeric film affixed to both the frame and to the optical film, so that tension in the elastomeric film suspends the optical film. In one embodiment, the elastomeric film includes a first attachment region proximate a first edge and a second attachment region proximate a second edge, and a free region between the first and second attachment regions. The first attachment region is affixed to the frame, the second attachment region is affixed proximate a perimeter of the optical film, and the free region is in tension. In one embodiment, at least one of the first attachment region and the second attachment region is affixed using an adhesive. In another embodiment, at least one of the first attachment region and the second attachment region is affixed mechanically. In yet another embodiment, at least one of the first and second attachment regions are affixed over greater than 20% of the first or second edges, respectively. In yet another embodiment, at least one of the first and second attachment regions are affixed over greater than 90% of the first or second edges, respectively. In yet another embodiment, liquid crystal displays, graphic displays, lights and cavities that include the suspended optical film assemblies are disclosed.

In one aspect, methods of making a suspended optical film assembly are disclosed that include the steps of providing a frame; providing an optical film; providing an elastomeric film having a first attachment region, a second attachment region, and a free region between the first and second attachment regions; affixing the first attachment region to the frame; applying tension to the free region; and affixing the second attachment region to the optical film. In one embodiment, the step of affixing the second attachment region occurs before the step of applying tension and the step of affixing the first attachment region. In one embodiment, the step of applying tension occurs after both affixing steps. In another embodiment, the step of applying tension includes shrinking at least one of the optical film and the elastomeric film. In yet another embodiment, the step of applying tension includes expanding at least one of the frame and frame components. In yet another embodiment, the step of applying tension includes stretching the elastomeric film between the two affixing steps. In yet another embodiment, at least one of the steps of affixing the first attachment region and affixing the second attachment region includes affixing with an adhesive.

These and other aspects of the present application will be apparent from the detailed description below. In no event, however, should the above summaries be construed as limitations of the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
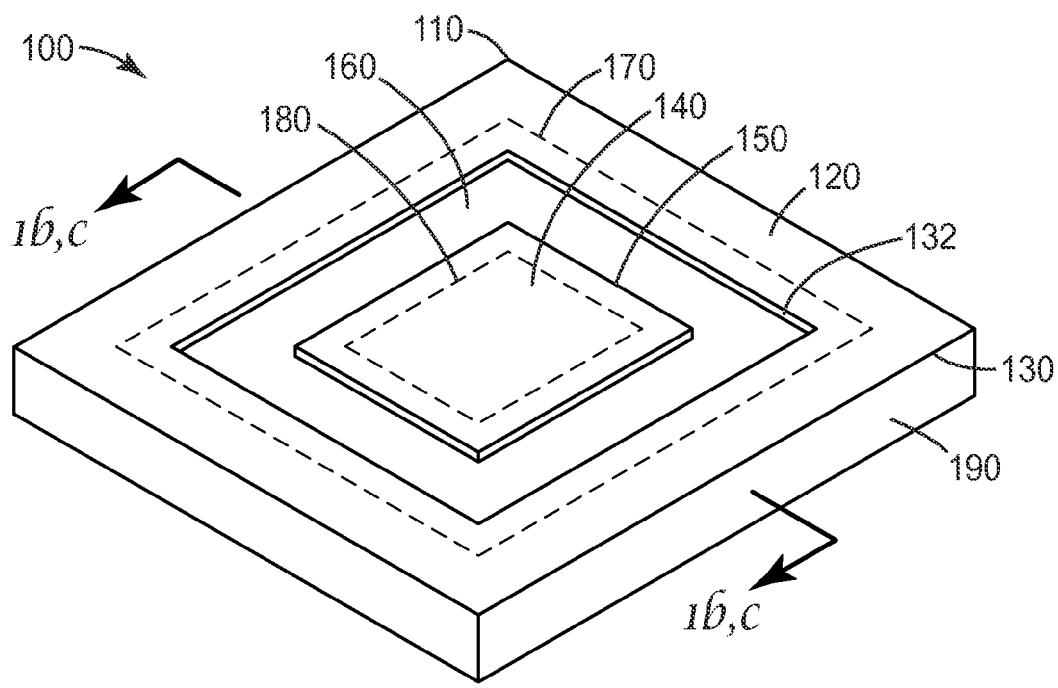
FIG. 1a is a perspective view of a suspended optical film assembly.

The present invention provides a suspended optical film assembly and a distributed suspension method that enables the use of thin optical films for backlights and displays, even when the display area is large. The optical film is suspended by tension in an elastomeric element distributed around the edges of the film, resulting in a flatter and less distorted optical film. The tendency of the optical film to distort, for example during thermal cycling of components with unmatched coefficients of thermal expansion (CTE), is reduced due to a "free region" within the elastomeric element that is unattached to other components.

In one aspect, suitable elastomeric elements can be fabricated from any elastomer that can provide sufficient tension to suspend the optical film. In one embodiment, examples of some elastomeric materials include natural rubber, silicone rubber, butyl rubber, nitrile rubber, urethanes, metallocene based polyethylenes, Kraton polymers, or other known elastomeric materials. The elastomeric materials can be formed into films, tapes, sheets, plates and the like. Elastomeric elements are herein referred to generically as elastomeric films, although it is to be understood that this is intended to include films, tapes, sheets plates and the like. Elastomeric films having a thickness dimension similar to the thickness of the optical film can be preferable elastomeric films. In a one embodiment, the elastomeric film provides uniform tension to the edges of the optical film. In another embodiment, the elastomeric film provides non-uniform tension to the edges of the optical film; however uniform tension is generally preferred.

An imaging plane can be suspended across the viewing area using the methods described herein. Graphic films, flexible image planes, or even glass imaging planes can be suspended to permit large area imaging planes to be thin and light weight. Suspended imaging planes can be particularly useful for thin flexible displays, such as flexible LCDs or organic light emitting diode displays (OLEDs) that typically need to be rigidified within a display device. Suspended imaging planes can also be useful for rigid display technologies that are not inherently flexible, such as traditional glass-based LCDs. Such LCDs can be made thinner when suspended, rather than thicker to be self supportive in a larger display. Further, optical films disposed behind the imaging plane can be used to manage polarization and other optical properties.

The suspended optical film assembly, method of suspending an optical film, and displays incorporating the suspended optical film assembly overcome limitations of thicker sheet-based methods. Thinner, lighter, more optically efficient, and more cost effective displays result from the articles and methods described herein.

In one aspect, the suspended optical film assembly comprises at least one optical film, at least one elastic element, and a supporting frame. The elastic element can be an elastomeric film, sheet, tape and the like. In one embodiment, a backlight includes the suspended optical film assembly and a light source disposed to emit light through the suspended optical film assembly. In one embodiment, cooling air can be supplied to the suspended optical film assembly, for example with a fan where cooling air flows either normally or at an angle relative to the film. In one embodiment, cooling air can flow between two sheets or films, such as in a hollow backlight.

In one embodiment, the optical film is suspended on the frame, with tension supplied by the elastic element where the elastic element is a stretchy or elastomeric tape that is anchored to the optical film and frame. In one embodiment, the suspended optical film assembly is used in a lighting device, such as used for task lighting. In one embodiment, the suspended optical film assembly is used in an LCD display. In one embodiment, the suspended optical film assembly is used to suspend optical films in front of a display. In one embodiment, the suspended optical film assembly is used to suspend optical films behind a display.

In one aspect, the elastomeric film can be an elastomeric tape. In one embodiment, the elastomeric tape can have adhesive patterns coated on it, so that a portion of the tape is free to stretch or shrink with out sticking to the frame or film. In one embodiment, the elastomeric tape can be clear or colored. The tape can be hidden from view in the display, or the tape may be visible. In one aspect, the elastomeric film can be secured to the frame by an adhesive. Suitable adhesives include pressure sensitive adhesives, hot-melt adhesives, thermally curable adhesives, radiation curable adhesives and others as known in the art. In one embodiment, the elastomeric film can wrap around the frame. In one embodiment, the frame can be designed to provide tension to the elastomeric film. In one embodiment, the frame can be used to mechanically affix the elastomeric film as described elsewhere.

In one embodiment, the suspended optical film assembly can further include a vibration damping system, to reduce or eliminate oscillations that may occur during movement, due to the mechanical properties of the elastomeric film/optical film suspension. In some embodiments, the vibration damping system can include at least one post disposed adjacent the elastomeric film and/or the optical film so that movement is restricted during such oscillations. In some embodiments, the at least one post can be attached to either the elastomeric film, the optical film, or both.

FIG. 1a shows a perspective view of suspended optical film assembly 100 according to one aspect of the invention. In FIG. 1a, frame 110 includes a first surface 130 including a top 120 and an optional side 190 extending from the top 120, and a second surface 131. The frame 110 can be a flat frame that does not have optional side 190, or it can be a box-like frame that includes side 190. Side 190, when included, generally extends from the top 120, however in some cases, a portion of side 190 may be missing. Top 120 has a top edge 132, and can generally have any width, but generally extends to a width sufficient to provide an attachment surface as will be described elsewhere.

The frame 110 can be constructed of one or more of several types of material, depending on the relative ease of construction, cost of materials, and size/weight considerations. The frame can provide a three dimensional structure surrounding a cavity as described elsewhere, and can provide a location for disposing the backlight and other components related to the display in a desired order within the cavity. The frame can also be a component of the backlight itself.

The frame material can be comprised of a metal such as aluminum, titanium, magnesium, steel, metal alloys, and the like. The frame material can also be made from non-metallic transparent, opaque, or transflective materials, such as: plastics, composites including carbon-fiber and/or glass-fiber composites, glasses and the like. The frame can be either a structure separate from an enclosure, or it can be formed as an integral part of the enclosure.

In some embodiments, suitable frame materials preferably have a high modulus of elasticity, for example greater than about $10^5$ N/mm$^2$, while still being able to be readily formed into a three-dimensional structure. Examples of such materials include sheet metals, including cold-rolled metals, such as aluminum, steel, stainless steel, tin and other metals in thin sheet form. Sheet metals can be readily shaped or formed by common metal forming techniques, such as by stamping. Optionally, the frame can be formed from a cast metal, including a die-cast aluminum or aluminum alloys. The thickness of the frame material used can be less than 1 mm thick, for example, 0.2 mm thick, or it can be thicker if desired.

Returning to FIG. 1a, an elastomeric film 160 overlays the top 120 of frame 110 and can provide support to suspend optical film 140. Elastomeric film 160 can be any elastomeric film with desired properties, as described elsewhere. Elastomeric film 160 includes a first edge 170, extending around the outer perimeter of the film that is proximate the first surface 130 of frame 110. In one embodiment, elastomeric film 160 overlays top 120 of frame 110. In one embodiment, elastomeric film 160 also includes a second edge 180, extending around the inner perimeter of the film, which overlays an optical film 140. Elastomeric film 160 can be a sheet of film with a central opening cut to accommodate optical film 140, or elastomeric film 160 can comprise several different pieces of elastomer generally surrounding optical film 140. Optical film 140 includes a perimeter 150 which is disposed proximate first edge 170 of elastomeric film 160.

In one embodiment, elastomeric film 160 can be affixed to optical film 140 along a portion of the length of second edge 180 proximate optical film perimeter 150, for example at greater than 10%, 20%, 30%, 40%, 50%, 60%, 70%, 80% or greater than 90% of the length of the second edge 180. In one embodiment, the elastomeric film is attached over the entire length of the second edge 180. In one embodiment, elastomeric film 160 can be affixed to frame 110 along a portion of the length of first edge 170 proximate frame top edge 132, for example at greater than 10%, 20%, 30%, 40%, 50%, 60%, 70%, 80% or greater than 90% of the length of the first edge 170. In one embodiment, the elastomeric film is attached over the entire length of the first edge 170.

Optical film 140 will now be described in further detail. The optical film can be a thermoplastic film, a thermoset film or composite optical film having a layer comprising fibers embedded within a polymer matrix. The optical film can have additional layers attached to the first layer optical film. The composite film can have fibers such as inorganic fibers, organic fibers or a combination of inorganic and organic fibers. Suitable films are described in U.S. patent application Ser. No. 11/278,346, filed on Jan. 23, 2007, and other suitable films are also known in the art. In one embodiment, a composite optical film can have advantages such as a better coefficient of thermal expansion (CTE) and lower creep than optical films that are not composites. In another embodiment, optical films that are not a composite may be preferred, including thin films such as a multilayer optical film (MOF), microstructured films and others, as described elsewhere. Additional layers, if provided, can be the same as the first layer, or different.

The optical film, and additional layers, if provided, could be a structured (or microstructured) surface film such as Brightness Enhancement Film (BEF) to provide brightness enhancement, or other films including reflective polarizers including interference type such as multilayer optical films, blend polarizers, wire grid polarizers; other structured surfaces including turning films, retroreflective cube corner films; diffusers such as surface diffusers, gain diffuser structured surfaces, or structured bulk diffusers; antireflection layers, hard coat layers, stain resistant hard coat layers, louvered films, absorptive polarizers, partial reflectors, asymmetric reflectors, wavelength selective filters, films having localized optical or physical light transmission regions including perforated mirrors; compensation films, birefringent or isotropic monolayers or blends, as well as bead coatings, Fresnel films, lenslet films and dual-sided microstructured films. For example, a list of additional coatings or layers is discussed in further detail in U.S. Pat. Nos. 6,459,514 (Jonza) and 6,827,886 (Neavin et al.). The second layer can also be an additional composite optical film. Optionally, the first layer can also have any of the surface structures described above.

The optical film can optionally be laminated to, or be an integral part of, a light guide. For example, light can be injected into the optical film, or the optical film/light guide combination, along an edge of a film having extraction features including grooves, ridges or printed dots on one or both surfaces. The extraction features permit light to escape the interior of the film from one or both surfaces of the film. Extraction structures corresponding to light guides can be found, for example, in U.S. patent application Ser. No. 11/278,336.

In another embodiment, phosphor particles can be incorporated either within the optical film, or within one or more additional layers coated on the surface of the film. In this embodiment, the phosphor-loaded optical film can be used to down-convert light from a UV or blue LED as shown for example, in U.S. Patent Publication No. 20040145913 (Ouderkirk et al.). The phosphor loaded film can also be used with one or more wavelength selective films to improve efficiency of light utilization. Examples of wavelength selective films are shown, for example, in U.S. Pat. Nos. 6,010,751 (Shaw et al.), 6,172,810 (Fleming et al.) and 6,531,230 (Weber et al.).

The optical film can be a film, sheet or plate of polymer. In some embodiments, the optical film can be a stiff material having a high elastic modulus, for example greater than about $10^4$ N/mm$^2$. One approach for improving the stiffness of an optical film is to increase the modulus by including reinforcing fibers within the film. "Composite optical film", for the purposes of the present disclosure, means an optical film that has fibers incorporated within a polymer matrix, and where the fibers or particles can be organic or inorganic fibers. The composite optical film can optionally include either organic or inorganic particles in addition to the fibers. Some exemplary fibers are matched in refractive index to the surrounding material of the film so that there is little, or no, scatter of the light passing through the film. Although it can be desirable in many applications that the composite optical films are thin, e.g. less than about 0.2 mm, there is no particular limitation to the thickness. In some embodiments it can be desirable to combine the advantages of composite materials and greater thickness, for example creating thick plates used in LCD-TV's that could be 0.2-10 mm thick. The term "optical film" as used with respect to the present disclosure, can also include thicker optical plates or lightguides.

One embodiment of a reinforced optical film comprises a composite optical film of organic fibers disposed within a polymeric matrix. Another embodiment of a reinforced optical film comprises a composite optical film of inorganic fibers disposed within a polymeric matrix. The case of inorganic fibers disposed within a polymeric matrix are described below; however, it is to be understood that organic fibers could be substituted for inorganic fibers in some embodiments. The use of organic fibers can provide an additional optical effect, if birefringent organic fibers are used. Birefringent organic fibers are described in, for example, U.S. Patent Publication Nos. 20060193577 (Ouderkirk et al.) and 20060194487 (Ouderkirk et al.).

The orientation of the fiber (the "fiber axis") within the polymeric matrix can be varied, to influence the mechanical properties of the reinforced optical film. The fiber axis can either be oriented at 0 and 90 degrees relative to the frame, or at some other angle deemed advantageous to the mechanical design and bending resistance of the overall frame/film structure. Further, the fibers comprising the fabric do not have to be oriented at 0 and 90 degrees within the fabric. Orienting the fibers along the principal axes or diagonals of the display can provide particular advantage.

The inorganic fibers can be formed of glass, ceramic or glass-ceramic materials, and can be arranged within the matrix as individual fibers, in one or more tows or in one or more woven layers. The fibers can be arranged in a regular pattern or an irregular pattern. Several different embodiments of reinforced polymeric layers are discussed in greater detail in U.S. Patent Publication No. 20060257678 (Benson et al.). The fibers arranged in tows or woven fabrics are preferably continuous fibers rather than chopped or staple fibers. Although short chopped fibers, staple fibers or even particulates can be used to modify mechanical properties including the coefficient of thermal expansion (CTE) and warp resistance, continuous fiber constructions can modify the modulus and tensile properties to a greater extent. As a result, continuous fiber constructions allow the fiber to bear some of the stress within the film, when the frame is bent.

The refractive indices of the matrix and the fibers can be chosen to match or not match. In some exemplary embodiments, it can be desirable to match the refractive indices so that the resulting film is nearly, or completely, transparent to the light from the light source. In other exemplary embodiments, it can be desirable to have an intentional mismatch in the refractive indices to create either specific color scattering effects or to create diffuse transmission or reflection of the light incident on the film. Refractive index matching can be achieved by selecting an appropriate fiber reinforcement that has an index close to the same as that of the resin matrix, or by creating a resin matrix that has a refractive index close to, or the same as, that of the fibers.

The refractive indices in the x-, y-, and z-directions for the material forming the polymer matrix are referred to herein as $n_{1x}$, $n_{1y}$ and $n_{1z}$. Where the polymer matrix material is isotropic, the x-, y-, and z-refractive indices are all substantially matched. Where the matrix material is birefringent, at least one of the x-, y- and z-refractive indices is different from the others. The material of the fibers is typically isotropic. Accordingly, the refractive index of the material forming the fibers is given as $n_2$. The fibers can, however, be birefringent.

In some embodiments, it can be desired that the polymer matrix be isotropic, i.e. $n_{1x} \approx n_{1y} \approx n_{1z} \approx n_1$. Two refractive indices are considered to be substantially the same if the difference between the two indices is less than 0.05, preferably less than 0.02 and more preferably less than 0.01. Thus, the material is considered to be isotropic if no pair of refractive indices differs by more than 0.05, preferably less than 0.02. Furthermore, in some embodiments it is desirable that the refractive indices of the matrix and the fibers be substantially matched. Thus, the refractive index difference between the matrix and the fibers, the difference between $n_1$ and $n_2$ should be small, at least less than 0.03, preferably less than 0.01 and more preferably less than 0.002.

In other embodiments, it can be desired that the polymer matrix be birefringent, in which case at least one of the matrix refractive indices is different from the refractive index of the fibers. In embodiments where the fibers are isotropic, a birefringent matrix results in light in at least one polarization state being scattered by the reinforcing layer. The amount of scattering depends on several factors, including the magnitude of the refractive index difference for the polarization state being scattered, the size of the fibers and the density of the fibers within the matrix. Furthermore, the light can be forward scattered (diffuse transmission), backscattered (diffuse reflection), or a combination of both. Scattering of light by a fiber reinforced layer is discussed in greater detail in U.S. Patent Publication No. 20060257678 (Benson et al.).

Suitable materials for use as the optical film can also be used in the polymer matrix for a composite optical film. Such materials include thermoplastic and thermosetting polymers that are transparent over the desired range of light wavelengths. In some embodiments, it can be particularly useful that the polymers be non-soluble in water, the polymers can be hydrophobic or can have a low tendency for water absorption. Further, suitable polymer materials can be amorphous or semi-crystalline, and can include homopolymer, copolymer or blends thereof. Example polymer materials include, but are not limited to, poly(carbonate) (PC); syndiotactic and isotactic poly(styrene) (PS); C1-C8 alkyl styrenes; alkyl, aromatic, aliphatic and ring-containing (meth)acrylates, including poly (methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; saturated polyesters; poly(ethylene), including low birefringence polyethylene; poly(propylene) (PP); poly(alkane terephthalates), such as poly(ethylene terephthalate) (PET); poly(alkane napthalates), such as poly (ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds. These polymers can be used in an optically isotropic form.

In some product applications, it is important that film products and components exhibit low levels of fugitive species (low molecular weight, unreacted, or unconverted molecules, dissolved water molecules, or reaction byproducts). Fugitive species can be absorbed from the end-use environment of the product or film, e.g. water molecules can be present in the product or film from the initial product manufacturing or can be produced as a result of a chemical reaction (for example a condensation polymerization reaction). An example of small molecule evolution from a condensation polymerization reaction is the liberation of water during the formation of polyamides from the reaction of diamines and diacids. Fugitive species can also include low molecular weight organic materials such as monomers, plasticizers, etc.

Fugitive species are generally lower molecular weight than the majority of the material comprising the rest of the functional product or film. Product use conditions might, for example, result in thermal stress that is differentially greater on one side of the product or film. In these cases, the fugitive species can migrate through the film or volatilize from one surface of the film or product causing concentration gradients, gross mechanical deformation, surface alteration and, sometimes, undesirable out-gassing. The out-gassing could lead to voids or bubbles in the product, film or matrix, or problems with adhesion to other films. Fugitive species can, potentially, also solvate, etch or undesirably affect other components in product applications.

Several of these polymers can become birefringent when oriented. In particular, PET, PEN, and copolymers thereof, and liquid crystal polymers, manifest relatively large values of birefringence when oriented. Polymers can be oriented using different methods, including extrusion and stretching. Stretching is a particularly useful method for orienting a polymer, because it permits a high degree of orientation and can be controlled by a number of easily controllable external parameters, such as temperature and stretch ratio.

Both the optical film, and composite optical film matrix can be provided with various additives to provide desired properties to the optically polymeric film. For example, the additives can include one or more of the following: an anti-weathering agent, UV absorbers, a hindered amine light stabilizer, an antioxidant, a dispersant, a lubricant, an anti-static agent, a pigment or dye, a phosphor, a nucleating agent, a flame retardant and a blowing agent.

Some exemplary embodiments can use a polymer material that is resistant to yellowing and clouding with age. For example, some materials such as aromatic urethanes become unstable when exposed long-term to UV light, and change color over time. It can be desired to avoid such materials when it is important to maintain the same color for a long term.

Other additives can be provided to the optical film or composite optical film matrix for altering the refractive index of the polymer or increasing the strength of the material. Such additives can include, for example, organic additives such as polymeric beads or particles and polymeric nanoparticles. In some embodiments, the film is formed using a specific ratio of two or more different monomers, where each monomer is associated with a different final refractive index when polymerized. The ratios of the different monomers determine the refractive index of the final resin.

In other embodiments, inorganic additives can be added to the optical film or composite optical film matrix to adjust the refractive index, or to increase the strength and/or stiffness of the material. Inorganic additives can also affect the matrix durability, scratch resistance, CTE or other thermal properties. For example, the inorganic material can be glass, ceramic, glass-ceramic or a metal-oxide. Any suitable type of glass, ceramic or glass-ceramic, discussed below with respect to the inorganic fibers, can be used. Suitable types of metal oxides include, for example, titania, alumina, tin oxides, antimony oxides, zirconia, silica, mixtures thereof or mixed oxides thereof. Such inorganic materials can be provided as nanoparticles, for example milled, powdered, bead, flake or particulate in form, and distributed within the matrix. Nanoparticles can be synthesized, for example, using gas-phase or solution-based processing. The size of the particles is preferably lower than about 200 nm, and can be less than 100 nm or even 50 nm to reduce scattering of the light passing through the matrix. The additives can have functionalized surfaces to optimize the dispersion and/or the rheology and other fluid properties of the suspension, or to react with the polymer matrix. Other types of particles include hollow shells, for example hollow glass shells.

Any suitable type of inorganic material can be used for the fibers in a composite optical film. The fibers can be formed of a glass that is substantially transparent to the light passing through the film. Examples of suitable glasses include glasses often used in fiberglass composites such as E, C, A, S, R, and D glasses. Higher quality glass fibers can also be used, including, for example, fibers of fused silica and BK7 glass. Suitable higher quality glasses are available from several suppliers, such as Schott North America Inc., Elmsford, N.Y. It can be desirable to use fibers made of these higher quality glasses because they are purer and so have a more uniform refractive index and have fewer inclusions, which leads to less scattering and increased transmission. Also, the mechanical properties of the fibers are more likely to be uniform. Higher quality glass fibers are less likely to absorb moisture, and thus the film becomes more stable for long term use. Furthermore, it can be desirable to use a low alkali glass, since alkali content in glass increases the absorption of water.

Discontinuous reinforcements in the composite optical film, such as particles or chopped fibers, can be preferred in polymers that need stretching or in certain other forming processes. Extruded thermoplastics filled with chopped glass, for example, as described in U.S. patent application Ser. No. 11/323,726, incorporated herein by reference, can be used as the fiber-filled reinforcing layer. For other applications, continuous glass fiber reinforcements (i.e. weaves or tows) can be preferred since these can lead to a larger reduction in the coefficient of thermal expansion (CTE) and a greater increase in modulus.

Another type of inorganic material that can be used for the fiber is a glass-ceramic material. Glass-ceramic materials generally comprise 95%-98% vol. of very small crystals, with a size smaller than 1 micron. Some glass-ceramic materials have a crystal size as small as 50 nm, making them effectively transparent at visible wavelengths, since the crystal size is so much smaller than the wavelength of visible light that virtually no scattering takes place. These glass-ceramics can also have very little, or no, effective difference between the refractive index of the glassy and crystalline regions, making them visually transparent. In addition to the transparency, glass-ceramic materials can have a rupture strength exceeding that of glass, and some types are known to have coefficients of thermal expansion of zero or that are even negative in value. Glass-ceramics of interest have compositions including, but not limited to, $Li_2O$—$Al_2O_3$—$SiO_2$, $CaO$—$Al_2O_3$—$SiO_2$, $Li_2O$—$MgO$—$ZnO$—$Al_2O_3$—$SiO_2$, $Al_2O_3$—$SiO_2$, and $ZnO$—$Al_2O_3$—$ZrO_2$—$SiO_2$, $Li_2O$—$Al_2O_3$—$SiO_2$, and $MgO$—$Al_2O_3$—$SiO_2$.

Some ceramics also have crystal sizes that are sufficiently small that they can appear transparent if they are embedded in a matrix polymer with an index of refraction appropriately matched. The Nextel™ Ceramic fibers, available from 3M Company, St. Paul, Minn., are examples of this type of material, and are available as thread, yarn and woven mats. Suitable ceramic or glass-ceramic materials are described further in *Chemistry of Glasses, $2^{nd}$ Edition* (A. Paul, Chapman and Hall, 1990) and *Introduction to Ceramics, $2^{nd}$ Edition* (W. D. Kingery, John Wiley and Sons, 1976), the relevant portions of both of which are incorporated herein by reference.

In some exemplary embodiments, it can be desirable not to have perfect refractive index matching between the matrix and the fibers, so that at least some of the light is diffused by the fibers. In some of such embodiments, either or both of the matrix and fibers can be birefringent, or both the matrix and the fibers can be isotropic. Depending on the size of the fibers, the diffusion arises from scattering or from simple refraction. Diffusion by a fiber is non-isotropic: light can be diffused in a direction lateral to the axis of the fiber, but is not diffused in an axial direction relative to the fiber. Accordingly, the nature of the diffusion is dependent on the orientation of the fibers within the matrix. If the fibers are arranged, for example, parallel to the x-axis, then the light is diffused in directions parallel to the y- and z-axes.

In addition, the matrix can be loaded with diffusing particles that isotropically scatter the light. Diffusing particles are particles of a different refractive index than the matrix, often a higher refractive index, having a diameter up to about 10 µm. These can also provide structural reinforcement to the composite material. The diffusing particles can be, for example, metal oxides such as were described above for use as nanoparticles for tuning the refractive index of the matrix. Other suitable types of diffusing particles include polymeric particles, such as polystyrene or polysiloxane particles, or a combination thereof. The diffusing particles can also be hollow glass spheres such as type S60HS Glass Bubbles, produced by 3M Company, St. Paul, Minn. The diffusing particles can be used alone to diffuse the light, or can be used along with non-index-matched fibers to diffuse the light, or can be used in conjunction with the structured surface to diffuse and re-direct light.

Some exemplary arrangements of fibers within the matrix include yarns, tows of fibers or yarns arranged in one direction within the polymer matrix, a fiber weave, a non-woven, chopped fiber, a chopped fiber mat (with random or ordered formats), or combinations of these formats. The chopped fiber mat or nonwoven can be stretched, stressed, or oriented to provide some alignment of the fibers within the nonwoven or chopped fiber mat, rather than having a random arrangement of fibers. Furthermore, the matrix can contain multiple layers of fibers: for example the matrix can include more layers of fibers in different tows, weaves or the like. In one specific embodiment, the fibers are arranged in two layers.

Figure 1B:
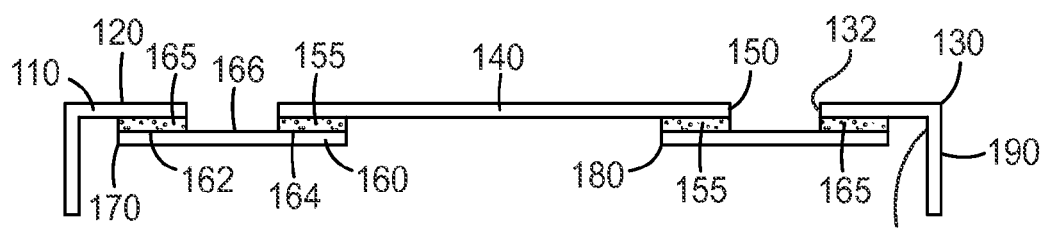
FIG. 1b is a cross-section view of FIG. 1a according to one embodiment.

FIG. 1b shows a cross-section of the suspended optical film assembly 100 of FIG. 1a, according to one embodiment. In FIG. 1b, elastomeric film 160 is affixed to the second surface 131 of frame 110 proximate top edge 132, at a first attachment region 162 adjacent first edge 170. First attachment region 162 can extend the span as shown in FIG. 1b between top edge 132 and first edge 170, or attachment region 162 can be narrower than the span, leaving top edge 132 and first edge 170 unattached. Elastomeric film 160 is also affixed to optical film 140 proximate perimeter 150, at second attachment region 164 adjacent second edge 180. Second attachment region 164 can extend the span as shown in FIG. 1b between perimeter 150 and second edge 180, or attachment region 162 can be narrower than the span, leaving perimeter 150 and second edge 180 unattached.

Figure 1C:
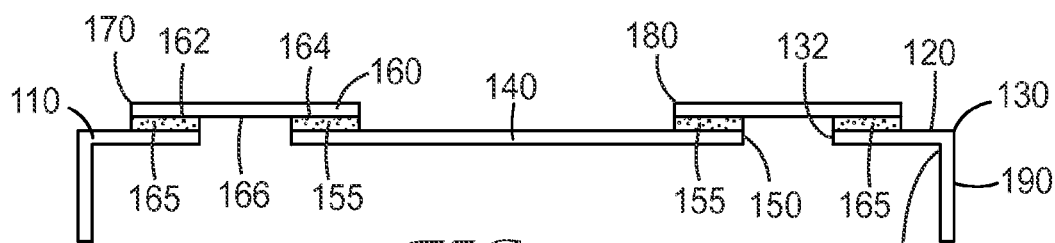
FIG. 1c is a cross-section view of FIG. 1a according to another embodiment.

FIG. 1c shows a cross-section of the suspended optical film assembly 100 of FIG. 1a, according to another embodiment. In FIG. 1c, elastomeric film 160 is affixed to the first surface 130 of frame 110 proximate top 120, at a first attachment region 162 adjacent first edge 170. First attachment region 162 can extend the span as shown in FIG. 1c between top edge 132 and first edge 170, or attachment region 162 can be narrower than the span, leaving top edge 132 and first edge 170 unattached. Elastomeric film 160 is also affixed to optical film 140 proximate perimeter 150, at second attachment region 164 adjacent second edge 180. Second attachment region 164 can extend the span as shown in FIG. 1c between perimeter 150 and second edge 180, or attachment region 162 can be narrower than the span, leaving perimeter 150 and second edge 180 unattached.

Referring to both FIG. 1b and FIG. 1c, elastomeric film 160 includes a free region 166 under tension, free to expand or contract to permit relative motion between optical film 140 and frame 110. The relative motion can be arise due to different CTEs of both optical film 140 and frame 110, during a change in the temperature of suspended optical film assembly 100. In one embodiment, the elastomeric film 160 can be affixed to at least one of the frame 110 and optical film 140 with a first and a second adhesive layer, 155 and 165, respectively. In one embodiment, the elastomeric film 160 can be affixed to at least one of the frame 110 and optical film 140 by a mechanical means such as clamping, crimping, and the like (not shown). In one embodiment, the elastomeric film 160 can be affixed to at least one of the frame 110 and optical film 140 by a thermal means such as melting or curing. In yet another embodiment, the elastomeric film 160 can be affixed to at least one of the frame 110 and optical film 140 by a combination of adhesive, mechanical and thermal means. In yet another embodiment, the elastomeric film 160 can be affixed to the frame 110 and optical film 140 by any combination of relative positions of elastomeric film 160, frame 110 and optical film 140 as shown in FIG. 1b and FIG. 1c. For example, two elastomeric films 160 can be used, with one being attached to the second surface 131 of frame 110 and optical film 140 as shown in FIG. 1b and the other being attached to the first surface 130 of frame 110 and optical film 140 as shown in FIG. 1c.

Figure 2A:
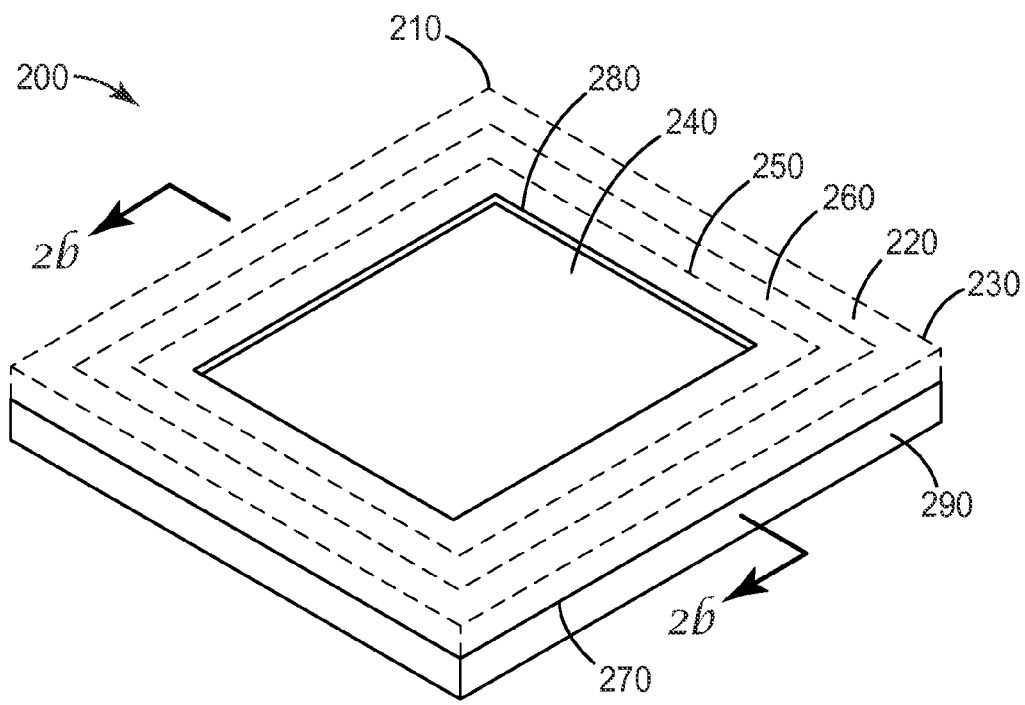
FIG. 2a is a perspective view of a suspended optical film assembly.

FIG. 2a shows a perspective view of suspended optical film assembly 200 according to another aspect of the invention. In FIG. 2a, frame 210 includes a first surface 230 including a top 220 and a side 290 extending from the top 220, and a second surface 231. Top 220 and side 290 include a top edge 232 and a side edge 233. Top 220 and side 290 can generally have any width, but generally extends to a width sufficient to provide an attachment surface as will be described elsewhere. Frame 210 can be made using any of the frame materials described elsewhere, such as for frame 110 in FIG. 1a. An elastomeric film 260 overlays the first surface 230 including the top 220 and extends down the side 290 of frame 210. Elastomeric film 260 can provide support to suspend optical film 240. Elastomeric film 260 can be any elastomeric film with desired properties, as described elsewhere. Elastomeric film 260 includes a first edge 270 that is proximate the first surface 230 of frame 210, and a second edge 280 which overlays an optical film 240. Optical film 240 includes a perimeter 250 which is disposed proximate top edge 232.

Figure 2B:
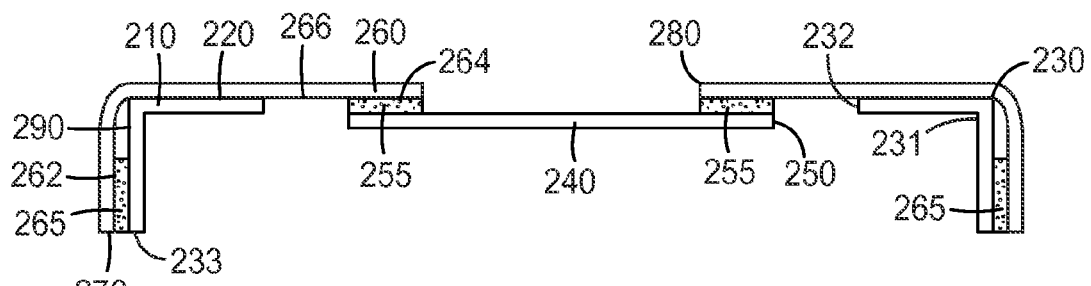
FIG. 2b is a cross-section view of FIG. 2a according to one embodiment.

FIG. 2b shows a cross-section of the suspended optical film assembly 200 of FIG. 2a, according to one embodiment. In FIG. 2b, elastomeric film 260 is affixed to the first surface 230 of frame 210 proximate side 290, at a first attachment region 262 adjacent first edge 270. First attachment region 262 can extend the span as shown in FIG. 2b between first edge 270 and a side edge 233 of frame 210, or attachment region 262 can be narrower than the span, leaving first edge 270 and side edge 233 unattached. Elastomeric film 260 is also affixed to optical film 240 proximate perimeter 250, at second attachment region 264 adjacent second edge 280. Second attachment region 264 can extend the span as shown in FIG. 1b between perimeter 250 and second edge 280, or attachment region 262 can be narrower than the span, leaving perimeter 250 and second edge 280 unattached. It is to be understood that although FIG. 2b shows optical film 240 attached below elastomeric film 260 (as viewed in the figure), optical film 240 can instead be attached above elastomeric film 260. In one embodiment, elastomeric film 260 can be a dual layer elastomeric film that is attached both above and below optical film 240, thereby sandwiching optical film 240

Referring to FIG. 2b, elastomeric film 260 includes a free region 266 under tension, free to expand or contract to permit relative motion between optical film 240 and frame 210. The relative motion can arise due to the effect of environmental changes on materials having different thermal or moisture expansion coefficients, such as in both optical film 240 and frame 210. The relative motion can also arise due to other time-dependent motions such as creep. In one embodiment, the elastomeric film 260 can be affixed to at least one of the frame 210 and optical film 240 with a first and a second adhesive layer, 255 and 265, respectively. In one embodiment, the elastomeric film 260 can be affixed to at least one of the frame 210 and optical film 240 by a mechanical means such as clamping, crimping, mating mechanical fasteners, and the like (not shown). In one embodiment, the elastomeric film 260 can be affixed to at least one of the frame 210 and optical film 240 by a thermal means such as melting or curing. In yet another embodiment, the elastomeric film 260 can be affixed to at least one of the frame 210 and optical film 240 by a combination of adhesive, mechanical and thermal means. In yet another embodiment, the elastomeric film 260 can be affixed to the frame 210 and optical film 240 by any combination of relative positions of elastomeric film 260, frame 210 and optical film 240 as shown in FIG. 2b.

Figure 3A:
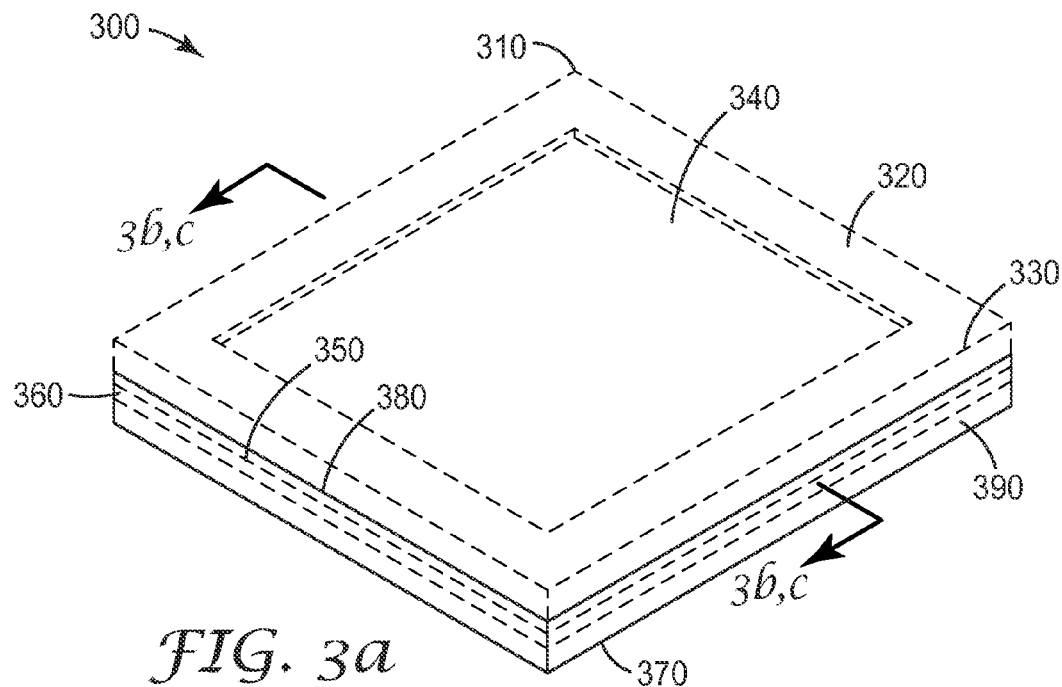
FIG. 3a is a perspective view of a suspended optical film assembly.

FIG. 3a shows a perspective view of suspended optical film assembly 300 according to another aspect of the invention. In FIG. 3a, frame 300 includes a first surface 330 including a top 320 and a side 390 extending from the top 320, and a second surface 331. Top 320 and side 390 have a top edge 332 and a side edge 333 (shown in FIG. 3b). Top 320 and side 390 can generally have any width, but generally extends to a width sufficient to provide an attachment surface as will be described elsewhere. Frame 310 can be made using any of the frame materials described elsewhere, such as for frame 110 in FIG. 1a. An optical film 340 overlays the first surface 330 including the top 320 and extends down the side 390 of frame 310. Elastomeric film 360 is affixed to optical film 340 and can provide support to suspend optical film 340. Elastomeric film 360 can be any elastomeric film with desired properties, as described elsewhere. Elastomeric film 360 includes a first edge 370 that is proximate the first surface 330 of frame 310, and a second edge 380 which overlays optical film 340. Optical film 340 includes a perimeter 350.

Figure 3B:
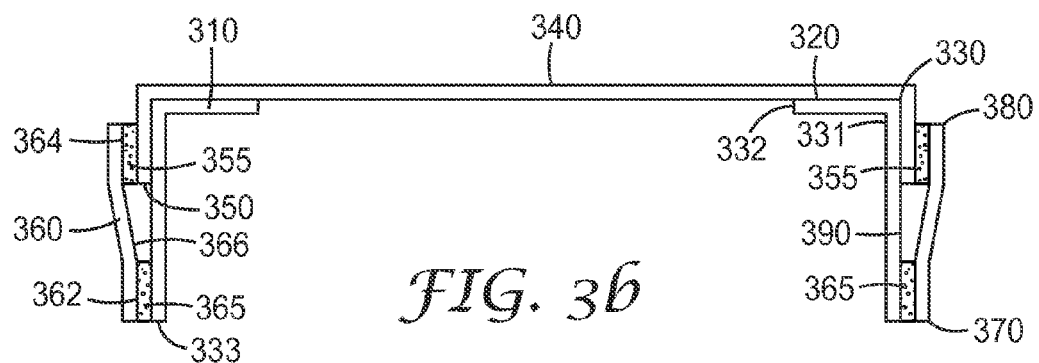
FIG. 3b is a cross-section view of FIG. 3a according to one embodiment.

FIG. 3b shows a cross-section of the suspended optical film assembly 300 of FIG. 3a, according to one embodiment. In FIG. 3b, elastomeric film 360 is affixed to the first surface 330 of frame 310 proximate side edge 333, at a first attachment region 362 adjacent first edge 370. First attachment region 362 can extend the span as shown in FIG. 3b between first edge 370 and a side edge 333 of frame 310, or attachment region 262 can be narrower than the span, leaving first edge 370 and side edge 333 unattached. Elastomeric film 360 is also affixed to optical film 340 proximate perimeter 350, at second attachment region 364 adjacent second edge 380. Second attachment region 364 can extend the span as shown in FIG. 3b between perimeter 350 and second edge 380, or second attachment region 364 can be narrower than the span, leaving perimeter 350 and second edge 380 unattached. It is to be understood that although FIG. 3b shows optical film 340 attached between elastomeric film 360 and frame 310, elastomeric film 360 can instead be attached between optical film 340 and frame 310.

Figure 3C:
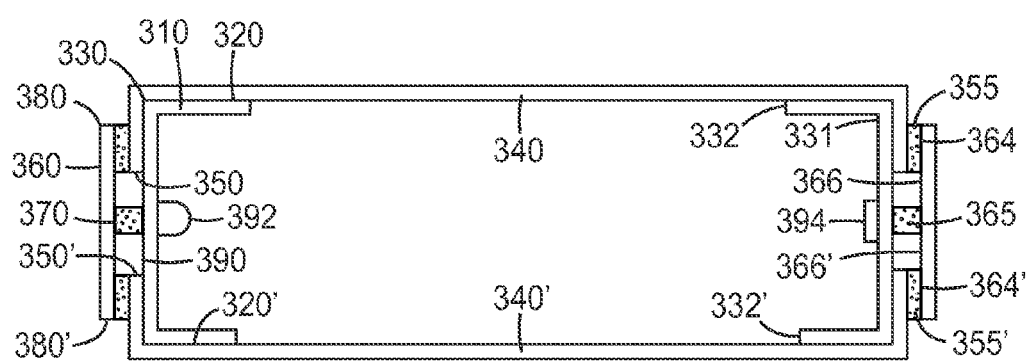
FIG. 3c is a cross-section view of FIG. 3a according to another embodiment.

FIG. 3c shows a cross-section of the suspended optical film assembly 300 of FIG. 3a, according to one embodiment. In FIG. 3c, frame 310 has a top 320, bottom 320', and side 390 connecting top 320 and bottom 320'. In one embodiment, elastomeric film 360 can be affixed to the first surface 330 of frame 310 proximate side 390, at a first attachment region 370. In another embodiment, elastomeric film 360 can be unattached to frame 310; in this embodiment, elastomeric film is attached to optical films 340, 340' as described elsewhere. Elastomeric film 360 is affixed to optical film 340 proximate perimeter 350, at second attachment region 364 adjacent second edge 380. Second attachment region 364 can extend the span as shown in FIG. 3c between perimeter 350 and second edge 380, or attachment region 364 can be narrower than the span, leaving perimeter 350 and second edge 380 unattached. It is to be understood that although FIG. 3b shows optical film 340 attached between elastomeric film 360 and frame 310, elastomeric film 360 can instead be attached between optical film 340 and frame 310.

Elastomeric film 360 is also affixed to optical film 340' proximate perimeter 350', at second attachment region 364' adjacent second edge 380'. Second attachment region 364' can extend the span as shown in FIG. 3c between perimeter 350' and second edge 380', or attachment region 364' can be narrower than the span, leaving perimeter 350' and second edge 380' unattached. It is to be understood that although FIG. 3b shows optical film 340' attached between elastomeric film 360 and frame 310, elastomeric film 360 can instead be attached between optical film 340' and frame 310.

Referring to FIGS. 3b and 3c, elastomeric film 360 includes a free region 366, 366' under tension, free to expand or contract to permit relative motion between optical film 340, 340' and frame 310. The relative motion can be arise due to the effect of environmental changes on materials having different thermal or moisture expansion coefficients, such as in optical films 340, 340' and frame 310. The relative motion can also arise due to other time-dependent motions such as creep. In one embodiment, the elastomeric film 360 can be affixed to at least one of the frame 310 and optical film 340, 340' with a first and a second adhesive layer, 355 and 365, respectively. In one embodiment, the elastomeric film 360 can be affixed to at least one of the frame 310 and optical film 340, 340' by a mechanical means such as clamping, crimping, and the like (not shown). In one embodiment, the elastomeric film 360 can be affixed to at least one of the frame 310 and optical film 340, 340' by a thermal means such as melting or curing. In yet another embodiment, the elastomeric film 360 can be affixed to at least one of the frame 310 and optical film 340, 340' by a combination of adhesive, mechanical and thermal means. In yet another embodiment, the elastomeric film 360 can be affixed to the frame 310 and optical film 340, 340' by any combination of relative positions of elastomeric film 360, frame 310 and optical film 340, 340' as shown in FIG. 3b.

In one embodiment, a suspended optical film assembly comprises the optical film affixed to the elastomeric film. The suspended optical film assembly, and therefore the elastomeric film, is held in tension prior to being affixed to the frame. The tension can be applied to the film in any manner known in the art, such as by gripping the edges of the film and applying tension to pull the edges apart. This application of tension (stress) induces a strain within the film, usually expressed as a strain percentage. The externally applied tension is maintained on the film until a bond is formed between the frame and the elastomeric film (i.e. when the film becomes affixed to the frame). The external tension can then be removed, and the elastomeric film is held in tension by the frame through the bond which has been formed. The result of affixing this pre-tensioned film to the frame is to suspend the optical film within the frame.

In another embodiment, the level of tension applied to the film is selected to improve the flatness of the film when attached to the frame. In one embodiment, flatness may be desired in two dimensions, such as a film suspended in a plane. In another embodiment, flatness may be desired in one dimension, such as in a film suspended between two curved frames forming, for example, a hollow cylinder, or a portion of a cylinder of material. Although any suspended body will sag somewhat due to its weight, the application of tension can minimize this sag, thereby improving flatness of the film.

Flatness of a film becomes particularly important when the film is used for display applications such as in laptops and handheld devices. Slight variations in the flatness due to warping, wrinkling or sag within the film can produce undesirable optical artifacts, particularly if the film participates in the transmission of an image, through refraction or reflection of light.

In another embodiment, the flatness of the optical film in the assembly can be controlled by the way that the film and frame are positioned as the film is affixed to the frame. For example, the film and frame can be assembled on a flat surface which is equipped with a device or system for holding the film flat, such as a vacuum table. In this manner, the film can be tensioned and placed on the vacuum table while the bond between the film and the frame is formed.

Figure 4A:
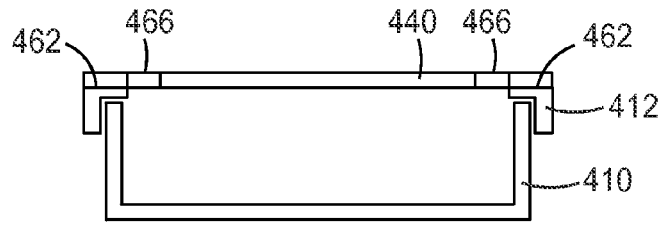
FIGS. 4a-b are cross-sectional views of a suspended optical film assembly.
Figure 4B:
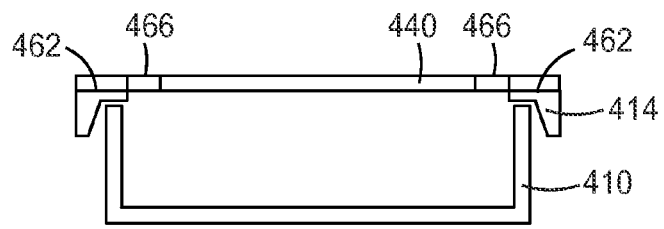

In yet another embodiment, the suspended optical film can be held in a support prior to affixing to the frame, for example as shown in FIG. 4a-b. In this embodiment, film support 412 is affixed at 462 adjacent free region 466 of elastomeric film attached to optical film 440 in one of the manners described above, or for example, the support can be a polymeric support that is formed in place around the film edges, while the film is held flat and in tension. The support can provide a convenient way to handle the film prior to, and during, affixation of the film to the frame via the support. The film and support can be affixed to the frame by the same methods used to affix the film to the frame as described above. In one embodiment, the support can have a feature which engages with the frame to mechanically "snap" in place, such as by use of a detent feature (not shown). In another embodiment, frame 410 can be oversized relative to support 412, so that as support 412 is affixed to the frame, further tensioning of free region 466 can result. FIG. 4b shows an alternative design of the support, where a taper provided on the inside support edge can apply additional tension to the film as the support is attached to the frame by one of the methods described above.

Figure 4C:
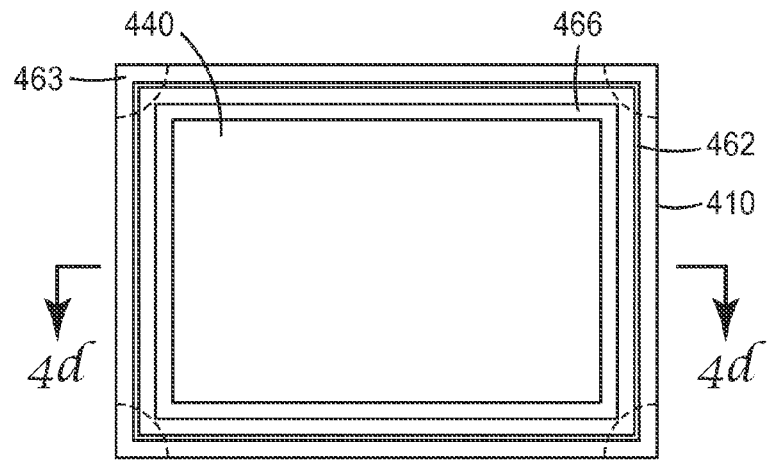
FIGS. 4c-d are top and cross-sectional views of a spline for attaching a film under tension to a frame.
Figure 4D:
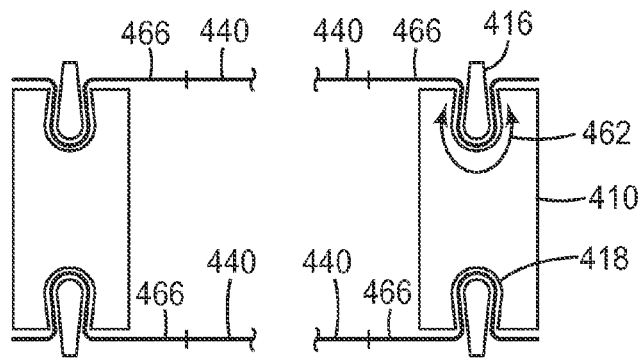

In another embodiment, the suspended optical film can be affixed to the frame by use of a spline as shown in FIGS. 4c-d. In this embodiment, groove 418 and spline 416 located within the periphery of frame 410 captures and affixes elastomeric film in attachment region 462 adjacent free region 466 to the frame. Free region 466 can be held in tension during attachment of the spline, alternatively, free region 466 can develop tension by the action of attaching the spline. In some instances, portions 463 of free region 466 can be removed from the corners as shown in FIG. 4c, to avoid wrinkling or distortion of free region 466 as spline 416 is attached. FIG. 4d depicts a spline affixing elastomeric films on both front and back of frame 410; however, it is to be understood that in some instances, only one film and one spline can be used.

In yet another embodiment, tension can be applied to the optical film by shrinking at least one of the optical film and the elastomeric film while it is affixed to the frame, for example either by heat-shrinking or by cure-shrinking. Heat shrinking of polymeric films can involve producing polymeric film as normal, heating it to near the polymer's glass transition temperature, and mechanically stretching the polymer (often by tentering) and then cooling the film while stretched. The heat-shrink polymer can be cross-linked, for example through the use of electron beams, peroxides or moisture, which can help to make the film maintain its shape both before and after shrinking. Upon reheating, the tendency is for the film to relax back to the original, un-stretched size. In this manner, tension develops in a stretched heat-shrink film attached to a frame, as the film is gently heated. Alternatively, the optical film can comprise a thermoset material, or more particularly a radiation curable material. If the optical film is a thermoset material, the film can be in either a fully-cured state or a partially-cured state when it is affixed to the frame. The term "fully-cured", for the purposes of the present disclosure, means a thermoset material that has substantially no remaining reactive groups that can undergo crosslinking or chain extension. The term "partially-cured", for the purposes of the present disclosure, means a "B-staged" material, and can be subject to further curing or crosslinking by the application of suitable heat, chemical activation, light or other radiation conditions, or a combination thereof. The process of further curing a B-staged material is generally associated with the occurrence of additional shrinkage during cure. In this manner, the B-staged material is affixed to the film frame and then subjected to additional cure. In another embodiment, the optical film comprises a fiber material that is stretched over the frame prior to coating with a thermoset polymer matrix, and subsequently cured. The film shrinkage that occurs upon curing generates the film tension that can reduce or eliminate sag and improve the rigidity of the backlight structure. Further descriptions of B-staged material can be found, for example, in U.S. Patent Publication No. 20060024482 and U.S. Pat. Nos. 6,352,782 and 6,207,726, and U.S. Provisional Application Nos. 60/947,771 and 60/947,785, filed on an even date herewith.

In another embodiment, the design of the frame can impart tension to the affixed film. Although film shrinkage is one method of achieving film tension in the frame, in some instances it may not be desirable for the film to shrink. For example, if the optical film is laminated to a reflective polarizer, shrinkage of the composite optical film could cause wrinkles in the reflective polarizer. Also, shrinkage of the reflective polarizer could affect the optical properties due to changes in the layer thicknesses. It may be beneficial to have assembly methods which do not require film shrinkage, but nonetheless ensure film tension. Representative examples of frame designs which can impart tension to the film are depicted in FIGS. 5a-f.

Figure 5A:
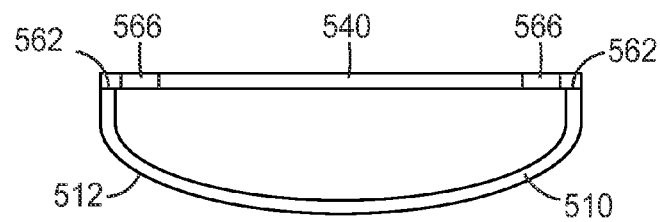
FIGS. 5a-h are schematic representations of several tensioning frame designs.

One embodiment of a film tensioning frame design is shown in FIG. 5a where frame 510 is designed to be slightly non-planar after affixing at 562 the elastomeric film adjacent free region 566. In this manner, when the film/frame assembly is pressed flat and secured in the enclosure, the resulting dimensional change places elastomeric film free region 566, and thus the optical film 540 in tension.

Figure 5B:
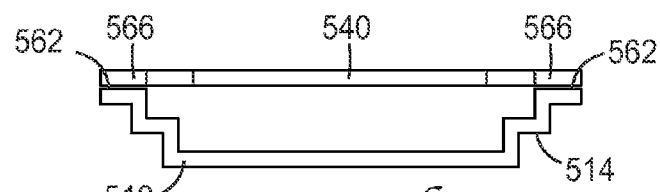

Another embodiment of a film tensioning frame design is shown in FIG. 5b where frame 510 has flexible section 514 which acts as a spring. Flexible section 514 is forced inward during affixation at 562 of elastomeric film adjacent free region 566. The force is then released, and the spring force generated by flexible section 514 serves to tension the elastomeric film free region 566 and thus the optical film 540.

Figure 5C:
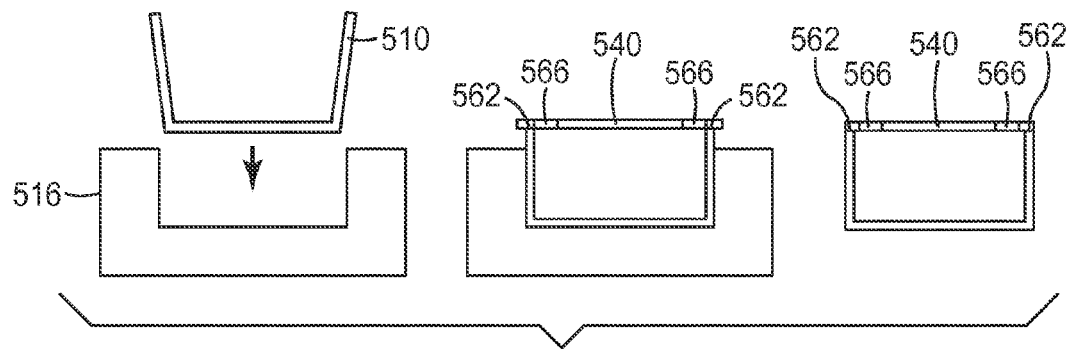

Additional embodiments of tensioning a frame prior to affixing the film are shown in FIG. 5c-f, which are schematic views of exemplary tensioning devices. FIG. 5c is a cross-sectional schematic view of frame 510 having sides which are skewed outward prior to being inserted into assembly block 516. Upon insertion, frame 510 is elastically deformed to conform to the shape of assembly block 516, and elastomeric film adjacent free region 566 is then affixed at 562 to frame 510 by any of the methods described previously. The film/frame assembly is removed from assembly block 516, resulting in tension applied by frame 510 to elastomeric film free region 566 and optical film 540 as frame 510 tends toward the original shape.

Figure 5D:
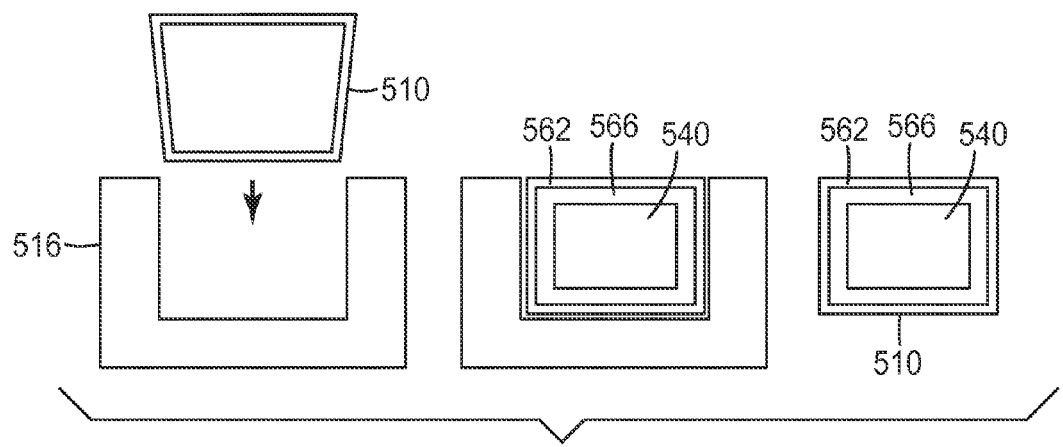

FIG. 5d is a top-view of another embodiment of film tension being applied by a frame, where untensioned frame 510 has, for example, a trapezoidal shape, and is inserted into assembly block 518, elastically compressing frame 510. Elastomeric film adjacent free region 566 is affixed at 562 to frame 510 using any of the methods described previously. The film/frame assembly is then removed from assembly block 518, resulting in tension applied by frame 510 to elastomeric film free region 566 as frame 510 tends toward the original shape. In this embodiment, untensioned frame 510 is oversized along at least one dimension. Upon insertion into assembly block 518, frame 510 is strained to conform to the shape of assembly block 518 prior to affixing elastomeric film adjacent free region 566 at 562.

Figure 5E:
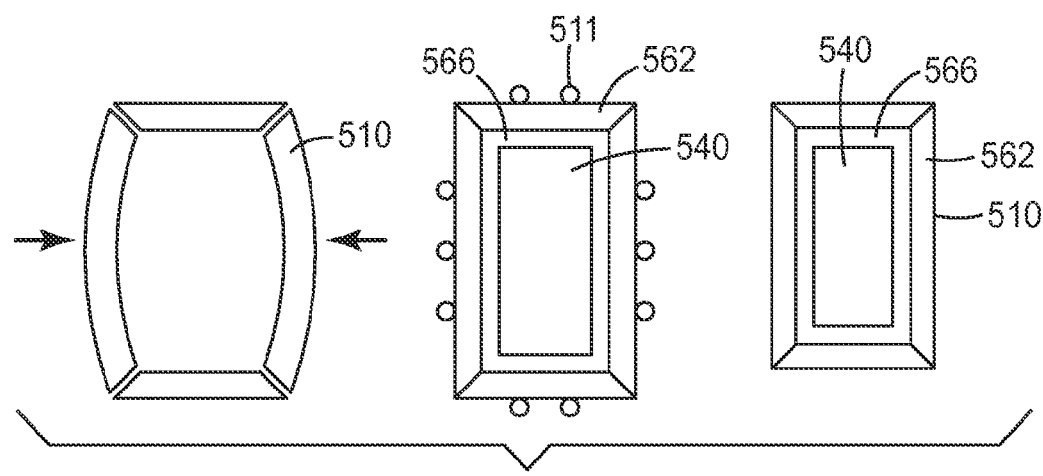

Another embodiment of film tension being applied to a frame is depicted in FIG. 5e, which is a schematic top-view, where frame 510 is comprised of at least some non-linear sides, for example curved or stepped, rather than straight. Frame 510 is forced into a rectangular shape by pins 511, prior to affixing elastomeric film adjacent free region 566 at 562 to frame 510 using any of the methods described previously. The film/frame assembly and pins are separated, resulting in tension applied by frame 510 to elastomeric film free region 566 and optical film 540 as frame 510 tends toward the original shape. It is to be understood that pins, assembly blocks, or other methods known in the assembly arts, can be used to retain the frame for any of the methods described above.

Figure 5F:
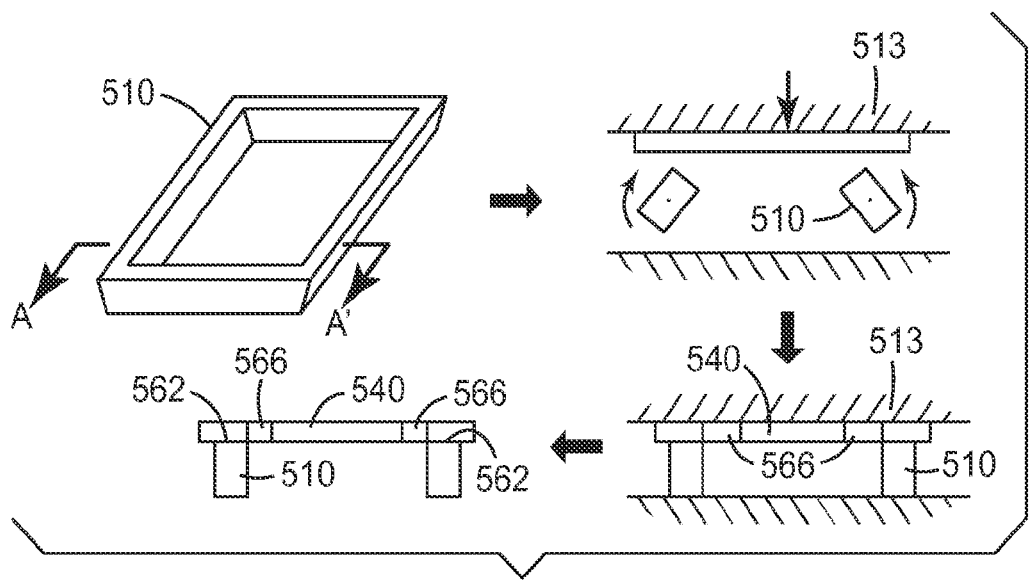

Another embodiment of tensioning the frame during attachment of the film is shown in FIG. 5f. In this embodiment, the sides of frame 510 are canted relative to the front and back surfaces of the frame. Elastomeric film adjacent free region 566 is affixed at 562 to frame 510 using any of the methods described previously as sides of frame 510 are elastically twisted by, for example, press 513. It is to be understood that the sides of frame 510 can be interconnected with a spring mechanism (not shown) to develop torsion within the frame sides, or the frame material itself can be twisted to effect the torsion. Film/frame assembly is removed from press 513, resulting in tension applied by frame 510 to elastomeric film free region 566 and optical film 540.

Figure 5G:
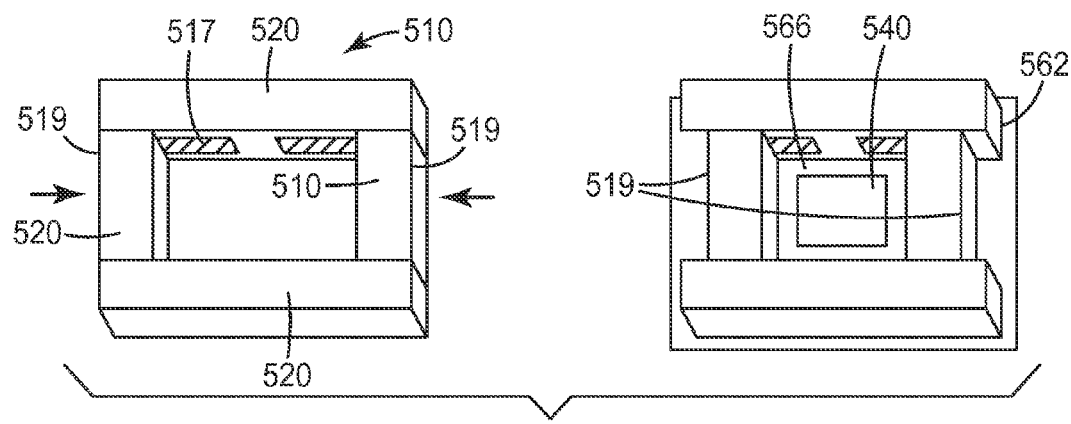

Another embodiment of tensioning the frame during attachment of the film is shown in FIG. 5g. In this embodiment, frame 510 has fixed sides 520 and moveable sides 519. Fixed sides 520 have captive springs 517 which are contained in a channel within fixed sides 520. Moveable sides 519 are connected to captive springs 517, and as sides 519 are moved inward as shown, captive springs 517 compress and exert a force on moveable sides 519. Elastomeric film adjacent free region 566 is affixed at 562 to frame 510 using any of the methods described previously while captive springs 517 are in compression, and resulting in tension applied to elastomeric film free region 566 and optical film 540.

Figure 5H:
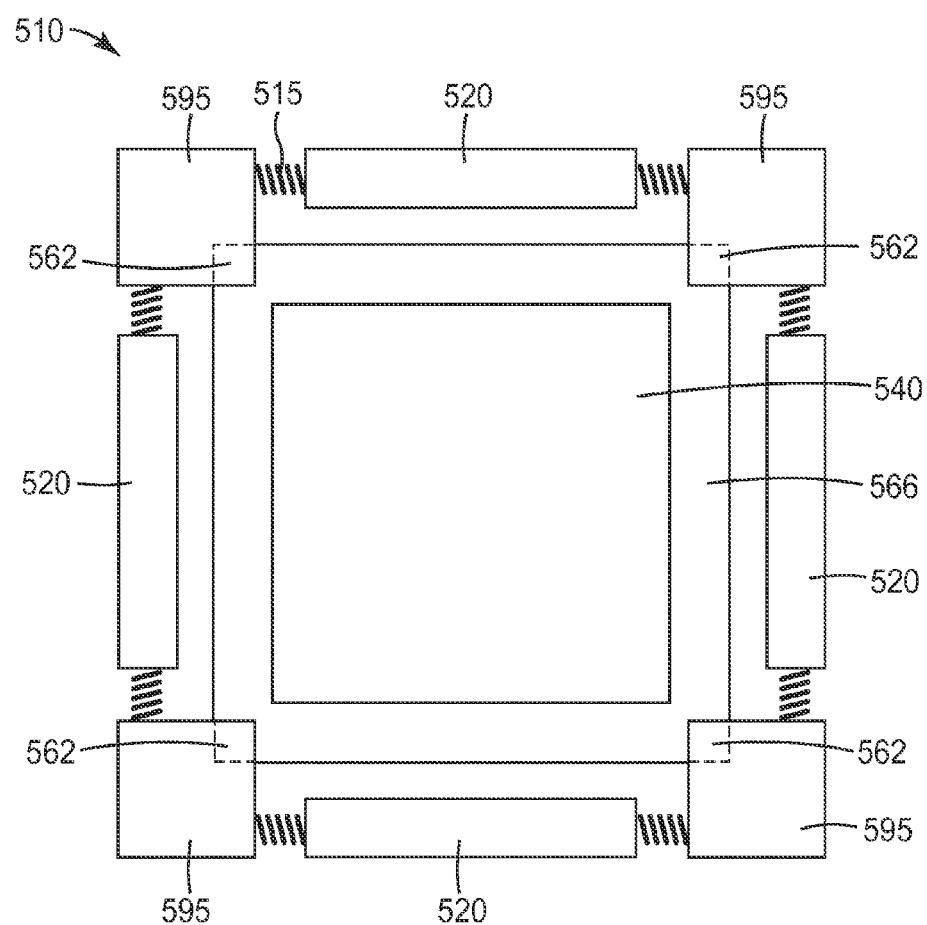

Another embodiment of tensioning the film is shown in FIG. 5h. In this embodiment, frame 510 has fixed sides 520 and moveable corners 595. Fixed sides 520 and moveable corners 595 have captive springs 515 contained in channels. Elastomeric film adjacent free region 566 is affixed at 562 to moveable corners 595 using any of the methods described previously while captive springs 515 are forced into compression, resulting in tension applied to elastomeric film free region 566 and optical film 540 when the force is released.

Regardless of the method used to apply strain to (i.e. slightly deform) the frame prior to affixing the film, it is to be understood that the amount of applied strain preferably should be below the yield strain (i.e. elastic deformation range) of the frame material, so the frame can transfer the applied strain to result in tension within the affixed film. Application of a strain greater than the yield strain can result in permanent deformation of the frame, and can result in unsatisfactory levels of tension being developed within the film.

Figure 6:
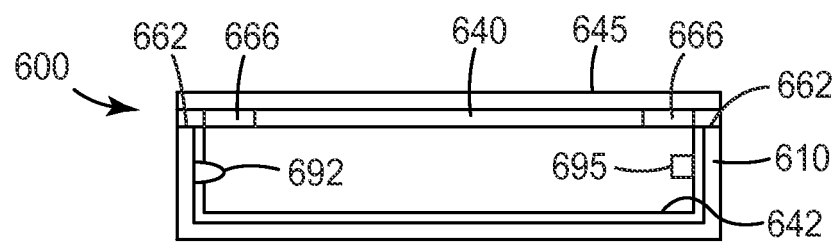
FIG. 6 is a cross-sectional view of a hollow backlight assembly.

In another embodiment, the optical film assembly is incorporated in a hollow backlight 600 as shown in FIG. 6. The hollow backlight can, for example, be an asymmetric reflective film having an approximately 11% transmission to improve light uniformity, as described in co-owned U.S. Patent Application Ser. Nos. 60/939,079, 60/939,082, 60/939,083, 60/939,084, and 60/939,085, all filed on May 20, 2007. In the hollow backlight of FIG. 6, frame 610 is provided with reflective surface 642, an LED 692, and a light sensor 695. LED 692 can be any of the semiconductor light sources described herein, and can also be located externally to frame 610, providing it is configured to provide light through an opening (not shown) in frame 610 to the reflective interior of the hollow backlight. In some embodiments, frame 610 can include a light collimating structure (not shown) which partially surrounds LED 692 and efficiently directs light into the hollow backlight cavity. Examples of suitable light collimating structures include flat, curved or segmented baffles or wedges; shaped optics such as parabolas, paraboloids, or compound parabolic concentrators; and the like. Reflective surface 642 can be the surface of the frame, or a separate highly reflective film attached to the frame. Asymmetric reflective film 645 is positioned adjacent to suspended optical film 640 adjacent elastomeric film free region 666 attached at 662 to frame 610. In one embodiment, reflective surface 642 can be a semispecular reflector such as a bead coated Enhanced Specularly Reflective (ESR) film as described, for example, in U.S. patent application Ser. No. 11/467,326. In another embodiment, asymmetric reflective film 645 can be replaced instead with a partially reflective film having a transmission greater than the approximately 11% transmission of the asymmetric reflective film, for example 20%, 30%, 40% or more can be used in the hollow backlight in some instances.

EXAMPLES

Example 1

A suspended optical film sample was made using an elastomeric film to suspend an optical film from an aluminum frame. A 0.2 cm thick rectangular aluminum frame measuring 19 cm in length and 15.5 cm in width was used. The aluminum frame had a rectangular hole measuring 13.7 cm long and 10.2 cm wide in the center. The elastomeric film was a rectangular sheet of rubber (Rubber Sheeting Light, available from VWR International, West Chester, Pa.) that was larger than the aluminum frame. A rectangular hole measuring 12.1 cm in length and 8.7 cm in width was cut from the center of the sheet. A piece of 1.2 cm wide double-sided adhesive tape (400 High Tack, 3M Company) was attached to the top surface of the perimeter of the center hole, and a separate piece of double-sided adhesive tape was attached to the bottom surface of the perimeter of the sheet. A thin (approximately 0.025 mm) optical film was attached to the adhesive tape around the perimeter of the hole, and the elastomeric film was then stretched in both length and width direction before the perimeter of the elastomeric frame was attached to the A1 frame, centering the optical film within the hole in the frame. A portion of the elastomeric film between the two adhesive tapes was free to accommodate thermal expansion and contraction of the optical film and frame.

The suspended optical film sample was then subjected to a uniform heating test to verify that it remained warp-free after ageing. The uniform heating test was performed by placing the suspended optical film sample in a 66° C. oven. The sample was removed from the oven after one hour, and visual inspection revealed no curl, warp or other deformations.

Example 2

A suspended optical film sample as described in Example 1 was subjected to a thermal shock test, a common environmental test for films. The test was performed in a chamber where the ambient temperature was held at −35° C. for one hour before the ambient temperature was quickly increased to 85° C. and held for one hour. The thermal cycle was repeated for 24 hours before the sample was removed and inspected. The sample was removed from the oven and allowed to return to room temperature. Visual inspection revealed no curl, warp or other deformations.

Example 3

A suspended optical film sample was prepared as described in Example 1 and subjected to a severe thermal gradient. The suspended optical film sample (BEF 90/50 on 0.23 mm PET, 3M Company) was placed so that 2.6 cm of the frame length rested on a hot plate at one end and 2.6 cm of the frame length rested on a cold plate at the other end. The hot plate was a heater with a 2 mm thick Al plate on top, and the cold plate was made by placing a 2 mm thick Al plate on top of an ice bath. The temperatures of the hot and cold plates were monitored with embedded thermocouples. The hot plate was kept at approximately 60° C. and the cold plate at approximately 0° C. Temperature gradients can contribute to warp of optical films, and this example created a severe temperature gradient from one edge of the sample to the other. The suspended optical film sample was compared to a control sample made from a similar optical film 15 cm long and 10.8 cm wide, that was simply taped to an aluminum frame along the four edges of the film. The frame for the control sample was a 0.2 cm thick rectangular aluminum frame measuring 19 cm in length and 15.4 cm in width. The aluminum frame had a rectangular hole measuring 14 cm long and 10.4 cm wide in the center. Each sample was tested for approximately 1.5 hours. Visual inspection showed that the control film sample had wrinkled, while the suspended optical film sample remained warp-free.

Example 4

In this example, a multilayer optical film (DBEF-Q, available from 3M Company) measuring 60.8 cm by 35.8 cm was elastically suspended above a 26" diagonal CCFL backlight. The optical film was first attached to the elastomeric film with double-sided tape as described in Example 1. The elastomeric film was then stretched in both length and width direction, and the outer edge of the elastomeric sheet was attached to the four outside edges of the backlight with double-sided tape. The backlight was then turned on and the film visually remained flat after running the backlight for several hours at full brightness.

Example 5

A suspended optical film article was made on an aluminum frame having a "C" shaped cross-section. The frame was made from an extruded aluminum channel having a thickness of 1 mm, a top and bottom width of 15 mm, and a side height of 8 mm connecting the top and bottom of the channel. A frame 310 mm square with a 280 mm square open area was made by fixturing adjacent sides together and filling the corner formed by each pair of adjacent sides and the C cross section of the frame with 3M Scotch-Weld Epoxy DP100, available from 3M Company. The epoxy was cured and held the corners together at a right angle.

A 125 um thick PET film was cut into a 290 mm square. A strip of Tegaderm™ transparent dressing (3M Tegaderm™ 1628, available from 3M Company) was applied to one side of the film, leaving a portion of the Tegaderm™ over hanging the edge of the film. The PET film was then centered on the frame, and the exposed portion of the Tegaderm™ was pressed onto the exposed portion of the frame, securing the PET film to the frame. Another piece of Tegaderm™ was then applied to the opposite edge of the PET film, again leaving exposed Tegaderm™. Before pressing the Tegaderm™ to the frame, the PET film was pulled taught, stretching the Tegaderm™ on the opposite side. The Tegaderm™ on the second side was then pressed down on the frame, leaving the PET film in tension with the elastomeric Tegaderm™. The procedure was repeated for the other oriented edges, securing one edge and then the other in tension. The resultant article provided a suspended PET film held in elastic tension along the length of the film edge. The film could be depressed by pressing on it, and when released the film would pop back into its original position.

Example 6

A thin, lightweight, highly reflective hollow light cavity was made using two suspended optical films. The two suspended optical films were made using the same procedure as in Example 5; however instead of PET film, an ESR film was used to produce a mirror-like film suspended across each frame. Each frame was further modified by adhesively applying strips of ESR film on the interior edge of the frame (across the open portion of the "C" channel). The resultant suspended film and frame provided a highly reflecting article. The two suspended optical films were then placed together to form a cavity that was comprised of ESR covered edges and suspended ESR film top and bottom. The ESR film that was used for each of the frames had precision punched hole arrays which allowed light to leak out or into the cavity. When this framed cavity was held up to a light source, all of the holes emitted light, demonstrating a thin, light, and highly reflective hollow light cavity.

The invention described above can be applied anywhere that thin optical film structures are used, including displays such as TV, notebook and monitors, and used for advertising, information display or lighting. The present disclosure is also applicable to electronic devices including laptop computers and handheld devices such as Personal Data Assistants (PDAs), personal gaming devices, cellphones, personal media players, handheld computers and the like, which incorporate optical displays. The light sources used in conjunction with the suspended optical films can be, for example, cold cathode fluorescent (CCFL), high color gamut CCFL, LED, and other sources can be used.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A suspended optical film assembly, comprising:
a frame for a display;
an optical film; and
an elastomeric film affixed to the frame and to the optical film, the elastomeric film having a central opening cut to accommodate the optical film so that tension in the elastomeric film suspends the optical film.

2. The suspended optical film assembly of claim 1, wherein the elastomeric film comprises:
a first attachment region;
a second attachment region; and
a free region between the first and second attachment regions,
wherein the first attachment region is affixed to the frame, the second attachment region is affixed proximate a perimeter of the optical film, and the free region is in tension.

3. The suspended optical film assembly of claim 2, wherein the elastomeric film has a first edge, the first attachment region is proximate the first edge, and the first attachment region is affixed over greater than 20% of the length of the first edge.

4. The suspended optical film assembly of claim 2, wherein the elastomeric film has a first edge, the first attachment region is proximate the first edge, and the first attachment region is affixed over greater than 90% of the length of the first edge.

5. The suspended optical film assembly of claim 3 or 4, wherein the second attachment region is affixed over greater than 20% of the optical film perimeter.

6. The suspended optical film assembly of claim 3 or 4, wherein the second attachment region is affixed over greater than 90% of the optical film perimeter.

7. The suspended optical film assembly of claim 2, wherein at least one of the first attachment region and the second attachment region is affixed adhesively.

8. The suspended optical film assembly of claim 1, wherein the optical film is selected from a thermoplastic film, a thermoset film, or a composite film.

9. The suspended optical film assembly of claim 1, wherein the elastomeric film is selected from a natural rubber film, a butyl rubber film, a nitrile rubber film, a urethane film, a silicone film, a metallocene based polyethylene film, or a Krayton film.

10. A liquid crystal display comprising the suspended optical film assembly of claim 1.

11. A suspended optical film cavity comprising the suspended optical film assembly of claim 1, and further comprising:
a second elastomeric film affixed to the frame and to a second optical film, the second elastomeric film having a second central opening cut to accommodate the optical film so that tension in the second elastomeric film suspends the second optical film,
wherein a hollow cavity is formed between the first optical film, the second optical film, and the frame.

12. The suspended optical film cavity of claim 11, further comprising a light source disposed within the hollow cavity.

13. A suspended optical film assembly, comprising:
a frame for a display comprising a top and a first periphery adjacent the top;
an optical film comprising a second periphery disposed proximate the top;
an elastomeric film having a central opening cut to accommodate the optical film, comprising:
a first attachment region adjacent a first edge;
a second attachment region adjacent a second edge; and
a free region between the first and second attachment regions,
wherein the first attachment region is affixed to the frame proximate the first periphery, the second attachment region is affixed to the optical film proximate the second periphery, and the free region is in tension.

14. The suspended optical film assembly of claim 13, wherein the first attachment region is affixed to the top.

15. The suspended optical film assembly of claim 13, wherein the frame further comprises a side extending from the periphery, and the first attachment region is affixed to the side.

16. The suspended optical film assembly of claim 13, wherein the optical film is selected from a thermoplastic film, a thermoset film, or a composite film.

17. The suspended optical film assembly of claim 13, wherein the elastomeric film is selected from a natural rubber film, a butyl rubber film, a nitrile rubber film, a urethane film, a silicone film, or a Kraton film.

18. A liquid crystal display comprising the suspended optical film assembly of claim 13.

19. A suspended optical film cavity, comprising:
a frame for a display comprising:
a top and a first periphery adjacent the top;
a bottom and a second periphery adjacent the bottom;
a side connecting the first and second periphery;
a first optical film comprising a third periphery disposed proximate the top;
a second optical film comprising a fourth periphery disposed proximate the bottom;
a first and second elastomeric film, each having a central opening cut to accommodate the respective optical film comprising:
a first attachment region adjacent a first edge;
a second attachment region adjacent a second edge; and
a free region between the first and second attachment regions,
wherein the first attachment region of the first elastomeric film is affixed to the frame proximate the first periphery, the second attachment region is affixed to the first optical film proximate the third periphery, and the free region is in tension, and
wherein the first attachment region of the second elastomeric film is affixed to the frame proximate the second periphery, the second attachment region is affixed to the second optical film proximate the fourth periphery, and the free region is in tension.

20. The suspended optical film cavity of claim 19, further comprising a light source disposed between the first and second optical films.

* * * * *